June 17, 1924.
H. P. KRAFT ET AL
TIRE VALVE
Filed April 13, 1920
1,498,175
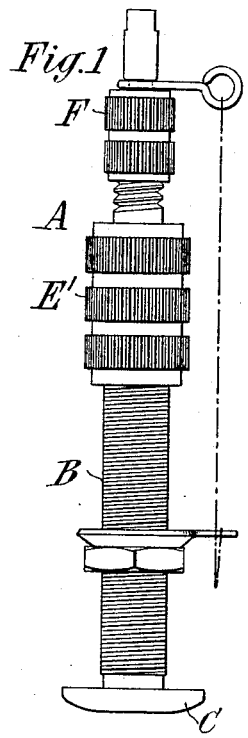
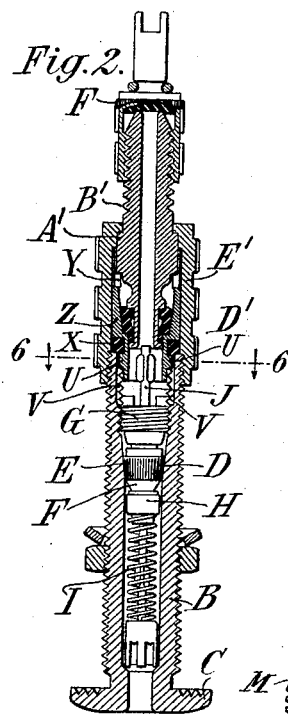
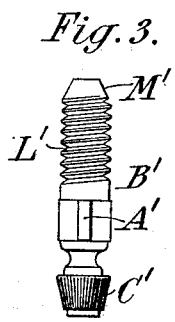
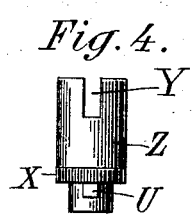
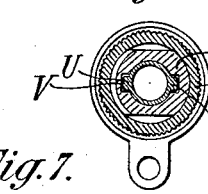
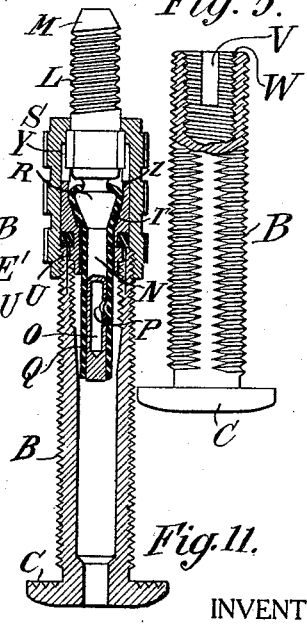
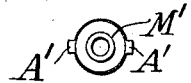
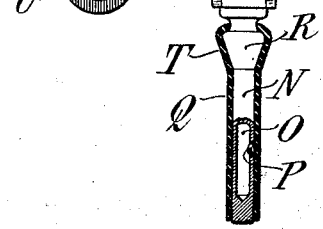
INVENTORS:
Henry P. Kraft and
Maximilian C. Schweinert
By Attorneys, Patented June 17, 1924.

1,498,175

UNITED STATES PATENT OFFICE.

HENRY P. KRAFT, OF RIDGEWOOD, NEW JERSEY, AND MAXIMILIAN C. SCHWEINERT, OF NEW YORK, N. Y.

TIRE VALVE.

Application filed April 13, 1920. Serial No. 373,555.

*To all whom it may concern:*

Be it known that we, HENRY P. KRAFT, of Ridgewood, in the county of Bergen and State of New Jersey, and MAXIMILIAN C. SCHWEINERT, of the borough of Manhattan, city, county, and State of New York, both citizens of the United States of America, have invented certain new and useful Improvements in Tire Valves, of which the following is a specification.

This invention relates to tire valves and aims to provide certain improvements therein.

The invention is particularly directed to a valve of the type known as the "E. W. D." valve, chiefly used in European countries, and which comprises essentially a casing, a plug entering said casing and having a hollow extension, an elastic sleeve surrounding said extension, the upper end of which usually acts as a packing for the plug, and a coupling designed to engage the plug and screw upon the casing, lugs being usually provided between the plug and the casing for preventing rotation between the two while the coupling is being tightened. In contradistinction to the standard American type of valve, the pump coupling is formed upon the upper end of the plug instead of on the casing.

The principal object of the present invention is to provide a valve of this type which is capable also of receiving the standard American or Schrader valve insides, the construction being designed to be initially furnished with such American insides, and nevertheless to possess the capacity of connection with the ordinary foreign pump, and also the capacity of receiving the foreign insides should the American insides become damaged, destroyed or lost.

In the drawing, wherein we have shown one form of the invention,—

Figure 1 is an elevation of the complete valve;

Fig. 2 is a diametrical section;

Fig. 3 is an elevation of the modified plug provided by the invention;

Fig. 4 is an elevation of the connector;

Fig. 5 is an elevation, partly in section, of the valve shell;

Fig. 6 is a section on the line 6—6, Fig. 2;

Fig. 7 is an elevation, partly in section, of the common form of foreign inside;

Figs. 8, 9 and 10 are, respectively, a top view of Fig. 3, a top view of Fig. 4, and an underside view of Fig. 4.

Fig. 11 is a diametrical section of the valve casing and connector showing a foreign valve mounted therein.

Referring to the drawings, let A indicate the device as a whole, which comprises a valve casing B having the usual foot C adapted for contact with the tire tube. The casing B is formed with a tapered shoulder D which is designed to engage the packing washer E of the standard American valve insides. This packing washer is carried by a seat F held in place by a screwthreaded plug G, the valve check H engaging the end of the seat, being urged upwardly by a spring I. J is the usual valve pin adapted for deflating or gauging purposes.

In the use of such valves in foreign countries, it is found that the standard pumps are not adapted to fit the American valve casings, the pump coupling being of smaller diameter and being adapted to engage the standard foreign valves. The foreign valve is usually provided with a plug similar to that shown in Fig. 7, which comprises a screwthreaded portion L adapted to be engaged by a pump coupling or a cap, a seat M adapted to make a tight joint with the pump coupling, an extension N having a bore O and opening or openings P, which extension is covered by a rubber sleeve Q which constitutes the valve proper. Air enters the top of the plug and passes downwardly through the bore O and outwardly through the passage P, and then downwardly between the extension N and the elastic sleeve. The extension N is customarily provided with a bevel shoulder R over which the top of the elastic sleeve Q fits, thus forming a packing which in the European structure is adapted to contact with a tapered seat so as to secure a tight joint between the plug and the valve stem. The plug is customarily provided with lugs S which enter slots in the casing so as to prevent relative rotation between the casing and the plug, and a coupling sleeve is provided which engages the tops of the lugs and threads on the valve casing.

It will be observed that both types of valve, namely, the standard American and standard European valve, have an internal tapered seat which is designed to be engaged by the valve packing E or the corresponding portion T of the European valve. However, the proportions of the two valves are such that the packing T will not fit the seat D of the American valve, and the packing E will not engage the corresponding seat of the European valve.

According to this invention we provide a connector Z, shown in Fig. 4, which at its lower end is provided with lugs U adapted to fit in grooves V in the valve casing B. These slots do not extend through the valve casing, but are formed on the inner side of the latter, thus leaving a seat W at the top of the valve casing. This seat is designed to engage a packing X carried by the connector, so that when the connector is introduced in the top of the valve casing and held tightly therein, a leak-tight joint will be made between the two. The upper end of the connector is formed with slots Y which are cut completely through the walls thereof, and which are designed to receive lugs A' formed on the plug B', Fig. 3. The plug B', Fig. 3, may in all respects correspond to the plug of Fig. 7, with the exception that the extension N is omitted, and because of the omission of this extension a separate packing C' is provided which is adapted to make a tight joint with a tapered shoulder D', Fig. 2, in the connector Z.

The parts are shown assembled in Fig. 2, the connector being inserted in the casing and the plug B' being inserted in the connector, and the whole being held together by a long coupling sleeve E'.

As thus assembled, the device acts as an American type valve, the American insides being introduced in place as shown. As thus assembled, the screwthread L' of the plug B' receives the usual foreign cap F', and the seat M' of the plug B' makes a tight joint with the usual foreign coupling. Should, however, for some reason, the American insides be destroyed or lost, and a substitute be unobtainable, the device is capable of receiving the standard foreign inside shown in Fig. 7. For this purpose the American insides are removed, if injured, and the foreign insides connected with the device through the medium of the connector Z as shown in Fig. 11. When so connected, the extension N projects downwardly through the connector into the valve casing, and the device acts as a foreign valve. An interchangeability is thus secured which is desirable, particularly in locations where the replacement of the American type of valve is impossible. The user may carry a supply of either the foreign or American valve insides and use either, as occasion or necessity may require.

While we have shown and described one form of the invention, it will be understood that we do not wish to be limited thereto, since various changes may be made therein without departing from the spirit of the invention.

What we claim is:—

1. In a tire valve, the combination of a casing having an internal thread at its top and a tapered shoulder below said thread adapted to receive the tapered packing on a Schrader valve inside, a tubular member on the top of the casing having an internal tapered shoulder of different inclination from the shoulder in the casing and adapted to receive the packing on a foreign of E. W. D. type of valve inside, a plug having a packing with a tapered face in engagement with the shoulder in the tubular member, said plug having a screw-threaded end for engaging a pump coupling and means for holding the plug, tubular member and casing in connected relation.

2. In a tire valve, the combination of a casing having an internal thread at its top and a tapered shoulder below said thread adapted to receive the tapered packing on a Schrader valve inside, said casing being formed with longitudinal grooves traversing the internal thread, a tubular member having lugs seating in said grooves and a packing forming a seal with the top of the casing, said tubular member having longitudinal slots in its upper end adapted to receive the radial lugs on a foreign or E. W. D. valve inside, and a plug having radial lugs seating in said slots, said plug having a screw-threaded end for engaging a pump coupling, and a sleeve engaging said plug and screwing on the exterior of the casing, holding the plug, tubular member and casing in connected relation.

3. A connector for tire valves, comprising a tubular member having a packing adapted to seat on the top of a valve casing and make a tight joint therewith, said tubular member having an internal tapered shoulder adapted to receive the tapered packing on a foreign or E. W. D. valve inside and a pair of diametrically opposite slots in said tubular member adapted to receive the lugs on such valve inside.

In witness whereof, we have hereunto signed our names.

HENRY P. KRAFT.
MAXIMILIAN C. SCHWEINERT.